United States Patent
McBrian

(10) Patent No.: US 8,635,198 B1
(45) Date of Patent: Jan. 21, 2014

(54) CENTRALIZED, SERVER-LESS CONTENT MANAGEMENT

(75) Inventor: Charles A. McBrian, Belmont, CA (US)

(73) Assignee: Adobe Systems Incorporated, San Jose, CA (US)

(*) Notice: Subject to any disclaimer, the term of this patent is extended or adjusted under 35 U.S.C. 154(b) by 1740 days.

(21) Appl. No.: 10/978,832

(22) Filed: Oct. 31, 2004

(51) Int. Cl.
*G06F 17/30* (2006.01)

(52) U.S. Cl.
USPC .......................................................... 707/695

(58) Field of Classification Search
CPC ......... G06F 21/10; G06F 21/31; G06F 21/00; G06F 2221/2149
USPC ...................................... 707/104.1, 200, 695
See application file for complete search history.

(56) References Cited

U.S. PATENT DOCUMENTS

2003/0149707 A1* 8/2003 Helmbrecht et al. ...... 707/104.1
2005/0210102 A1* 9/2005 Johnson et al. ............... 709/204

OTHER PUBLICATIONS

Vignette, "Vignette Collaboration" May 2004, Vignette, p. 1-31 <http://web.archive.org/web/20050306180913/a2000.g.akamai.net/7/2000/812/e5627ba877a55e/www.vignette.com/Downloads/WP_VignCollaboration.pdf>.*

Vignette, "Vignette Business Workspaces" Nov. 2003, Vignette, p. 1-4 <http://web.archive.org/web/20051210105934/a784.g.akamai.net/7/784/812/089b428a46caf9/www.vignette.com/Downloads/DS_VignetteContMgmt.pdf>.*
Vignette, "Vignette Content Management" Sep. 2003, Vignette p. 1-4 <http://web.archive.org/web/20051210105934/a784.g.akamai.net/7/784/812/089b428a46caf9/www.vignette.com/Downloads/DS_VignetteContMgmt.pdf>.*
Hiner, Kirk "Review: Macromedia Contribute 2" Aug. 2003, p. 1-5 <http://www.awprofessional.com/articles/printerfriendly.asp?p=23469&rl=1>.*
Greenspun, Philip, "Using CVS for Web Development" Oct. 25, 2002, www.archive.org <http://web.archive.org/web/20021025070647/http://philip.greenspun.com/wtr/cvs>, p. 1-8.*
Dreilinger, Sean, "CVS Version Control for Web Site Projects" May 31, 1999, Durak.org <http://durak.org/cvswebsites/howto-cvs/>.*

* cited by examiner

Primary Examiner — Jorge A Casanova
(74) Attorney, Agent, or Firm — Kilpatrick Townsend & Stockton LLP

(57) ABSTRACT

A content management system (CMS) is made up of a content server that includes a metadata file stored on the content server relating to transactions performed with a work-in-progress (WIP), a first folder on the content server for storing notifications to a plurality of users in a workflow group, and a second folder on the content server for storing one or more versions of the WIP. The CMS also includes a remote filing system associated with the content server. The CMS also includes interface logic at a computer of each of the plurality of users allows the user to manipulate the WIP and polls the first folder through the remote filing system for locating the notifications. A WIP state variable is included within the metadata file that assists the control of edit access to the WIP.

32 Claims, 5 Drawing Sheets

FIG. 8

CENTRALIZED, SERVER-LESS CONTENT MANAGEMENT

CROSS-REFERENCE TO RELATED APPLICATIONS

The present application is related to co-pending, commonly-owned, U.S. patent Ser. No. 10/688,062, entitled, "LIVE-SERVER CONTENT STAGING;" and co-pending, commonly-owned, U.S. patent Ser. No. 10/690,214, entitled "WEB SITE MANAGEMENT LIFECYCLE," the disclosures of which are incorporated herein by reference.

TECHNICAL FIELD

The present invention relates, in general, to content management systems and, more specifically, to a centralized, server-less content management system.

BACKGROUND OF THE INVENTION

The growth of the computer industry has led to the vast popularity of electronic documents and electronic document creation tools. What historically was created by hand, using typewriters, or using typeset printing is now typically created on a computer. Electronic documents may be easily edited and formatted before printing or may be placed in a centralized file server or onto a Web server to facilitate electronic access via the Internet. As the availability and use of electronic documents and tools to create such electronic documents has increased, a new application concept was developed for managing the creation and deployment of electronically created documents. Content Management Systems (CMS), Document Management Systems (DMS), Web Content Management Systems (WCMS), Enterprise Content Management Systems (ECMS), and the like, were developed to assist in the process of managing, creating, and deploying electronically created content.

CMS systems are typically used by large corporations to manage and organize the lifecycle of documents that are used or generated by the company. Routinely, a team of people are tasked with developing content, while other people, whether part of the same team or not, are tasked with reviewing the content, and while still other people may be given the authority to approve the content for final release. While some of each of the people involved in this content creation process may be the same, the typical organization is implemented with multiple people, where some people have authority to create and others have authority to approve and publish the content.

WCMS systems are a subset of CMS systems specifically intended to assist in the creation and maintenance of the lifecycle of Web pages and/or Web sites. Web pages and Web sites are typically designed by one or more teams of people. One team or group may be responsible for developing the graphics, while another team or group may be responsible for developing the content. WCMS systems allow for the group to work on the graphics and content of the Web site under development by managing versions of the various Web pages and permissions assigned to the various developers.

WCMS systems are typically implemented with a WCMS server that specifically serves the management application. The WCMS server is generally separate from the Web server that hosts the companies' Web site. The company that is developing the Web site will usually have a WCMS server, a Web server (whether the Web server is hosted by the company sponsoring the Web site or hosted by a third-party), an email server, and a file system. The filing system may include any type of remote filing system, such as WebDAV, File Transfer Protocol (FTP), Secure FTP (SFTP), Local Area Network (LAN), or the like. The Web pages under development are typically stored on the WCMS server using the filing system in which the developers having access to the WCMS server to work on the Web pages under development. A piece of content, such as a Web page, advertisement, press release, and the like, that is under development is sometimes referred to as a Work In Progress (WIP). The WCMS, working in conjunction with the filing system, will typically control who may have access to the WIP, whether that person is authorized to publish or deploy the WIP onto the live Web server. Thus, a WCMS system is typically a complex and elaborate system that is somewhat difficult to deploy and use. Because it generally requires its own server in addition to the Web server, email server, and file system, many smaller and medium-sized companies cannot take advantage of its benefits because of the expense of such a large and complex system.

CMS/DMS/ECMS systems are similar paradigms to a WCMS, but have a broadened scope that manages the lifecycle of documents or content instead of just managing Web pages or Web sites. CMS systems also typically require their own servers to manage the CMS operation. The CMS server is also separate from the live server that the content will eventually be deployed on, such as a Web server used to provide Intranet access, or other server providing the electronic access point. Additionally, the finalized content may eventually be published or printed onto paper or other tangible media for review. Such CMS systems also typically include an email server, to facilitate messaging between people in the content creation and approval workflow, and a filing system, where electronic documents are stored. Again, such systems are large, complex, and expensive which means that many smaller and medium-sized companies cannot afford to implement such applications.

BRIEF SUMMARY OF THE INVENTION

The present invention is directed to a system and method for implementing a content management system (CMS) comprising a filing system and non-dedicated server. Three folders are created on the non-dedicated server for the CMS. A metadata folder is created that holds a metadata file on each WIP being processed through the system. The metadata file stores all information surrounding the transactions with the WIP including each version, the state of the WIP, the users who have modified the WIP, and the like. A user folder, which includes a subfolder for each system user, is created to store system notifications or messages for the system participants. The client interface that the users interact with poll this folder to notify the various users of any messages in their folder. Users may be notified that a WIP is ready to be reviewed, that a WIP has been published, canceled, or the like. This relationship between the user folder and the client interface create a messaging system that operates without the need for a separate email server. The third folder created is a WIP folder. This folder holds the various versions of the WIP saved according to the user who owned that particular WIP version.

By providing managed interaction with these three folders and maintaining both staged and live content on the non-dedicated server, the CMS may provide content lifecycle management. When live content is to be edited, the live content is copied to the local storage of the user and then locked in its live position to prevent multiple users from editing at the same time. Using the WIP state attribute of the metadata file, the CMS system will provide locks both for the live data and for the metadata file. The metadata file is locked because it controls whether or not the WIP is in a edit state, in which case only the listed owner of the WIP may edit, or in an in-transit state, in which all parties in the workflow may view and, with the proper permissions, edit and/or publish the document. Therefore, the authority to change the WIP state and, consequently, keep unauthorized persons from changing it, is very important.

A WIP may then be sent for review to the people in the workflow group directly from the client interface. When the WIP is sent for review, the WIP state is changed to "in transit," after which the lock on the metadata folder is removed. A copy of the current version is saved in the WIP directory associated with the author of that version. Additionally, a notification is placed in the user subdirectories of each user notifying that the WIP is ready for review. The notification contains a pointer to the metadata file of the WIP. Using this pointer, the client interface of the users can find out any and all information maintained on the WIP, including the WIP itself.

When the WIP is published, a notification is placed in each of the user's subfolders indicating that it has been published and the final version is placed in the live location with any remaining locks removed. Depending on the embodiment of the system, the metadata information, WIP information, and notifications may be either deleted or archived in some manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
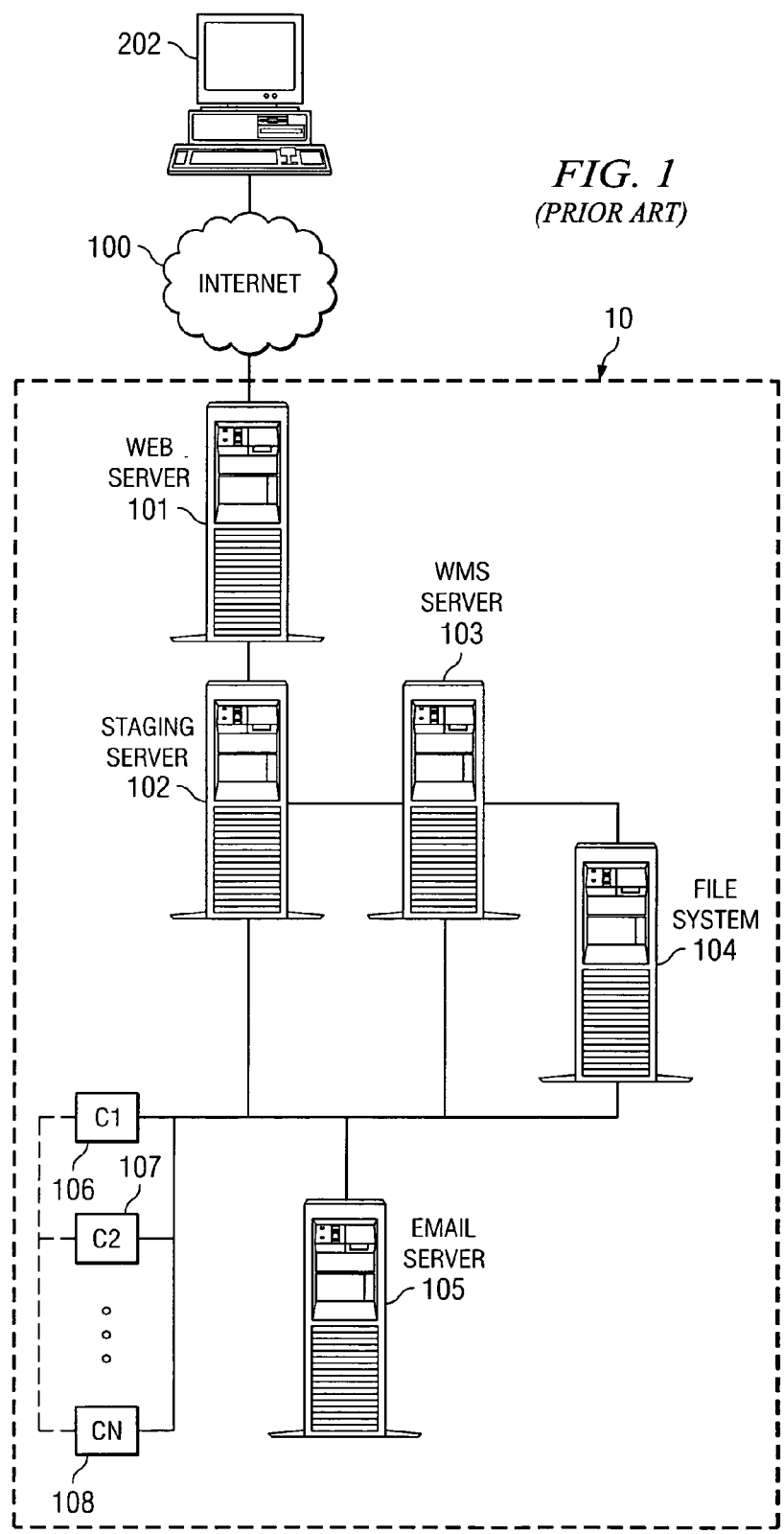
FIG. 1 is a block diagram illustrating a typical WCMS used in developing and deploying Web sites.

FIG. 1 is a block diagram illustrating typical WCMS 10 used in developing and deploying Web sites. User 202 may typically access a Web page or Web site via Internet 100. User 202 requests a particular Web page residing on Web server 101. That request is transmitted over Internet 100 and received by Web server 101. Web server 101 then serves the requested Web page to the browser running on the computer of user 202 via Internet 100. In a typical backend WCMS system, such as WCMS 10, Web server 101 is supported by staging server 102. Staging server 102, which is a completely separate and distinct server than Web server 101, is typically located behind a firewall that is inaccessible to the general public and is generally where Web pages in development are staged for review prior to releasing them to the public on Web server 101.

File system 104 and email server 105 are typical features of almost any computer system supporting variously-sized companies. A typical filing system, file system 104, such as WebDAV, FTP, SFTP, LAN, or the like, may be available or installed on the operating system selected by the company to run its computers and/or servers, such as MICROSOFT CORPORATION's WINDOWS™, APPLE COMPUTER COMPANY's OS X™, IBM's UNIX™, LINUX, or the like. The filing systems control the storage, organization, and access to files and/or information stored on the company's computer system, servers, or on an individual's computer. A typical email server, such as email server 105, controls and facilitates the electronic communication between members of the company's network and any other party inside or outside of the company. Examples of such email servers are MICROSOFT CORPORATION's OUTLOOK™, COREL CORPORATION'S GROUPWISE™, QUALCOMM INC.'s EUDORA™, and the like.

Prior to the implementation of WCMS systems, Web designers, such as C1-106, C2-107, and CN-108, would typically email hypertext markup language (HTML) documents, or other Web documents around to various people in the development workflow to edit, inspect, and/or approve the supporting Web site documents. The problems with this type of design workflow is the creation of multiple copies of the same document that each recipient may edit potentially without consideration for any of the edits made by any other member of the design workflow. A partial solution to this problem was to leave the original documents on file system 104, and direct the people in the design workflow to access the original document stored thereon. However, typical file systems may not have locking mechanisms that work well in Web design or content creation paradigms.

WCMS server 103 operates as a separate server that assists the control and development process for the design workflow. For example, a designer, such as C1-106 may design and develop a single Web page for the Web site deployed on Web server 101. This page may need to be reviewed and approved by other design team members prior to staging the Web page on staging server 102. Web designer C1-106 would save the Web page to WCMS server 103 and select the participants in the design workflow. WCMS server 103 would then send an email, through email server 105, to each of the design workflow participants designated by Web designer C1-106. For purposes of this example, it is assumed that Web designer C2-107 is the only other party that is requested to review the proposed Web page. Web designer C2-107 receives the email that a Web page WIP is ready for review. Web designer C2-107 would access WCMS server 103 to obtain a copy of the WIP. Web designer C2-107 may either review and approve or review and edit and then save the WIP back to WCMS server 103.

It should be noted that, in operation, a WCMS may also be used as a CMS to share, edit, manage, and the like, other types of content, such as Computer Aided Drawing (CAD) designs, spreadsheets, advertisements, help documents, and the like. The various implementations of CMS system may provide a wide reach of services to the lifecycle of various types of content.

Once the WIP is approved, it may then be staged onto staging server 102. An additional set of persons may be assigned the task of final review and approval of the WIP Web page to be deployed on the live server, Web server 101. WCMS server 102 continues to control access and availability to the WIP, now staged onto staging server 102. Once the WIP obtains final approval, it may then be published to Web server 101 for public access. Thus, WCMS server interoperates with each of staging server 102, file system 104, and email server 105 to control and manage the Web design workflow. However, this multi-server system is typically cost-prohibitive for medium-sized or smaller-sized companies. As an alternative, Web design companies, that invest in a WCMS system may be hired by such smaller companies to design the desired Web sites, and hosting companies, that invest in Web servers may be hired to host these Web sites. This third-party provider process makes Web development more accessible to the smaller companies, but also leaves much of the development, maintenance, and deployment of Web sites outside of the company's control. For the same reasons, CMS/ECMS systems are also not easily within the reach and control of medium to smaller-sized companies, while larger companies are faced with extremely complex and expensive systems to maintaining.

Figure 2:
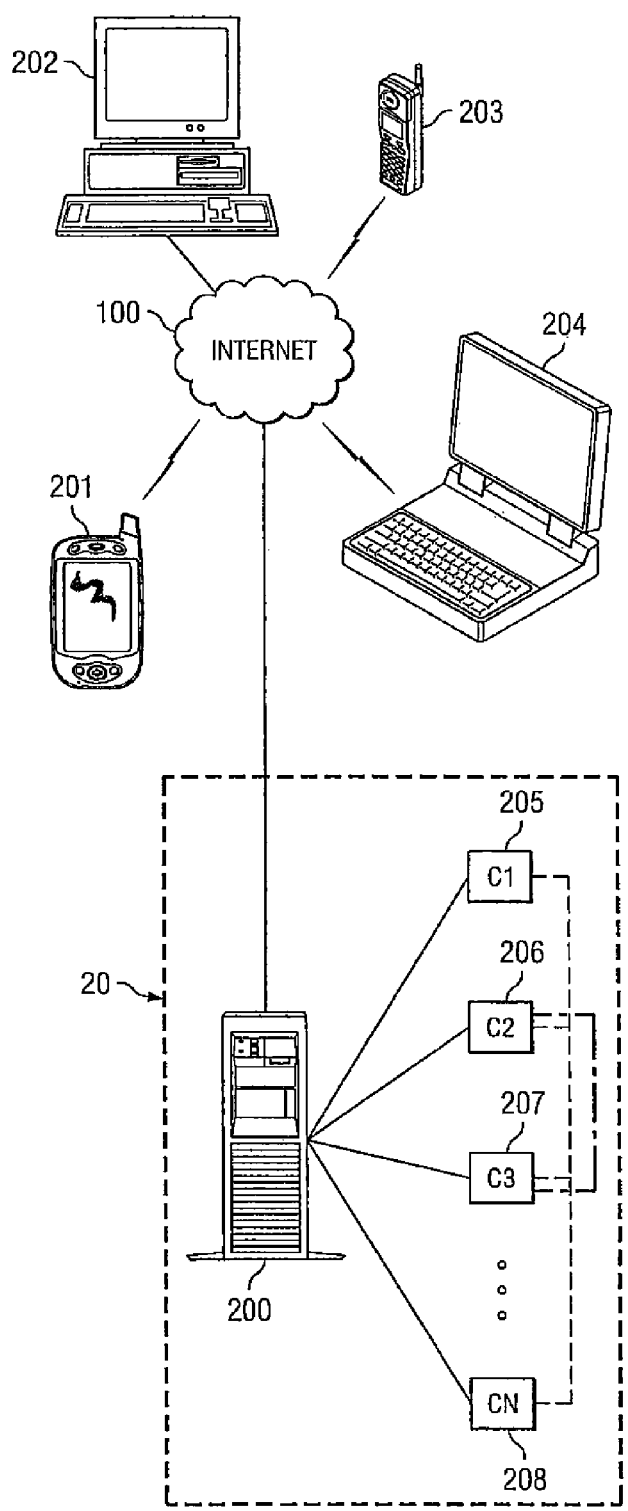
FIG. 2 is a block diagram illustrating a CMS system configured according to one embodiment of the present invention.

FIG. 2 is a block diagram illustrating CMS system 20 configured according to one embodiment of the present invention. CMS system 20 may be implemented as an ECMS, WCMS, a DMS, or other such content management system. The embodiment depicted in FIG. 2 is shown as a WCMS. Users 201-204 may each access Web pages or Web sites hosted on Web server 200 via Internet 100. One of the benefits of CMS system 20 is that Web server 200 hosts the live content but also serves as the staging server for the Web development process. This dual-role technology is described in co-pending, commonly-owned, U.S. patent Ser. No. 10/688,062, titled, "LIVE-SERVER CONTENT STAGING," the disclosure of which is incorporated herein for all purposes. Therefore, Web server 200 may be used, not only for deploying live content for access via Internet 100, but also may stage Web content in a manner that is not practically accessible by the general public before it has been deployed to a live location.

The embodiment of CMS system 20 is also defined by implementation of publishing software used by designers C1-205-CN-208. Such publishing software extends and enhances the filing system, that is generally incorporated into Web server 200, to include the identification and manipulation of content both deployed in a live context on Web server 200 and that which is staged on Web server 200. This type of publishing software may employ the technology referred to above in co-pending, commonly-owned, U.S. patent Ser. No. 10/688,062, titled, "LIVE-SERVER CONTENT STAGING" to implement development information directly on a live-content server, Web server 200, without subjecting the WIP content to easy unauthorized access. An example of this type of publishing software is MACROMEDIA INC.'s CONTRIBUTE™.

In addition to providing the system integrating features described with respect to CMS system 20, CONTRIBUTE™ also provides Web editing features similar to the full editing capabilities of Web design software, such as MACROMEDIA INC.'s DREAMWEAVER™, MICROSOFT CORPORATION's FRONTPAGE™, ADOBE SYSTEMS, INC.'s GO LIVE™, and the like. CONTRIBUTE™ also includes the technology described in co-pending, commonly-owned, U.S. patent Ser. No. 10/690,214, entitled "WEB SITE MANAGEMENT LIFECYCLE," the disclosure of which is incorporated herein by reference, that enables a complete Web site management including a browse-edit-publish workflow. By using such publishing software, the developer may simply browse to the Web page desired for editing or maintenance using the browser capabilities reflected in the editing console interface of the publishing software; edit the actual source document underlying that Web page, again directly from the editing console interface; and then publish the underlying Web page back to the Web server, again seamlessly through the editing console interface. Publishing software, such as CONTRIBUTE™ integrates in a complementary manner with full-fledged HTML editors such as those listed.

In example operation, Web designer C1-205 designs a Web page that is eventually to be deployed on Web server 200. Using the collaborative controls provided by the publishing software, designer C1-205 selects the parties that will participate in the design workflow. This designation may be completed on an ad hoc basis, with developer C1-205 selecting such parties for each page that is to be reviewed, or may be set in a "non-ad hoc" workflow preference, such that by merely indicating that the Web page WIP is to be sent for review, the publishing software automatically notifies each party in the workflow that a Web page is available for review. Those parties in this workflow may be designated earlier by an administrator or user as a preference that is saved onto the system for future referral.

In the present example, designer C1-205 selects a "Send For Review" button provided on the interface console by the publishing software, which automatically sends notifications to Web designers C2-206-CN-208. When each of designers C2-206-CN-208 starts up the publishing software or refreshes the information therein, a notification indicator is presented that indicates to designers C2-206-CN-208 that a Web page WIP is available for review. The notification includes a pointer to location of metadata that describes the relevant information about the Web page WIP, such that if one of the designers, such as designer C2-206, selects to review the Web page WIP, a local copy of the staged WIP is loaded to designer C2-206's computer to review the WIP. At this stage of the workflow, any of the designers in the workflow, C2-206-CN-208, may select to view the WIP. If, however, one of the designers in the workflow selects to edit the WIP, CMS system 20 locks the staged WIP, so that none of the other designers in the workflow may open the WIP for editing.

In the described example, designer C2-206 selects to edit the WIP sent for review by designer C1-205. As indicated, CMS system 20 locks the staged WIP, such that no other party in the workflow may edit the actual WIP staged on Web server 200. For purposes of this example, when designer C2-206 is finished editing, he or she selects to send the edited WIP to designer C3-207 for review. In this example, designer C3-207 determines that the WIP is ready for deployment and indicates to publish the WIP. Once this selection is made, the staged assets are saved to their live deployment locations and made available through regular access to Web server 200 via Internet 100.

It should be noted that on the publishing of the WIP, various embodiments of CMS system 20 may delete all of the staged assets or may archive the staged assets in order to save a history of the development process. The determination of such an archiving feature may be determined based on the amount of available storage space. Various embodiments of the present invention may store or delete such archiving information. The different or alternative embodiments of the present invention are not limited to one method of handling this information.

CMS system 20 performs its features and functions by leveraging a remote filing system for Web server 200 in addition to the client publishing software running on the developers' computers. This publishing software interacts with the remote filing system on Web server 200 to control the collaborative features described in the described embodiment of the present invention.

It should be noted that while the embodiment illustrated in FIG. 2 implements CMS system 20 by combining Web server 200 with the remote filing system, various additional and/or alternative embodiments of the present invention may be implemented using an actual database system.

Figure 3:
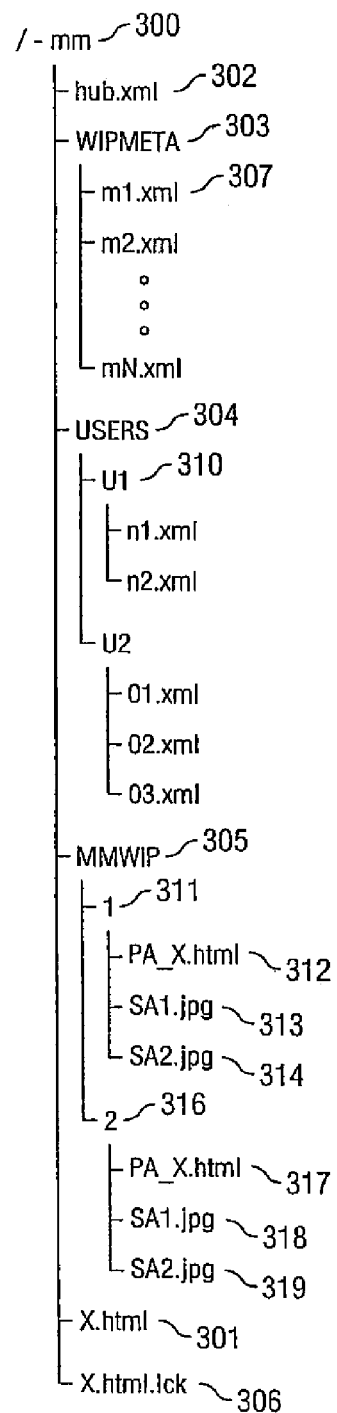
FIG. 3 is a chart illustrating a file structure representing the organization of the Web files used in implementing one embodiment of the present invention.

FIG. 3 is a chart illustrating file structure 30 representing the organization of the Web files used in implementing one embodiment of the present invention. File structure 30 represents the file structure on a Web server, such as Web server 200 (FIG. 2), for implementing a WCMS, but the structure illustrated may be similar to the structure employed for implementing a non-Web related, CMS system configured according to another embodiment of the present invention. The basis for file structure 30 is root directory 300. The Web page available on the hosting Web server is saved in root directory 300 at X.html 301. When a third party desires to access Web page X, the Web server serves up X.html 301 to the user's Web browser for display.

The filing system establishes three main directories in file structure 30 that are used in the implementation of the WCMS: a meta directory, WIPMETA 303, that is intended to hold metadata describing the activity surrounding the WIP; a user directory, USERS 304, with a folder for each authorized user of the WCMS system that is intended to hold notifications for the various users, as well as other files related to each designated user; and a WIP directory, MMWIP 305, that is intended to maintain all copies of the WIP as it is amended, edited, or the like, by each editing user. While these directories are shown in FIG. 3 clearly as file structure 30, it should be noted that these directories are created using the scrambling and obfuscation technology described in co-pending, commonly-owned, U.S. patent Ser. No. 10/688,062, titled, "LIVE-SERVER CONTENT STAGING," the disclosure of which is incorporated by reference herein.

Additional files, such as hub.xml 302, may be created to maintain a list of the policies, privileges, and authorities for each and every user that is allowed access to the WCMS, including lists of the users for various user groups in a design workflow. However, it should be noted that alternative or additional embodiments of the present invention may obtain this type of policy and privilege information from a remote server, remote directory, or remote database.

In operation, using a publishing software, such as CONTRIBUTE™, a first designer, C1 205, browses to Web page X and selects to edit the page. The underlying Web document, X.html 301, and any of the secondary assets are downloaded to C1 205's local computer. Furthermore, a file lock, X.html.lck 306, is created that prevents any other user or developer from accessing Web page X or its underlying primary asset, X.html 301, or secondary assets. A primary asset is the underlying HTML code that is run/displayed by the Web browser in displaying the Web page and usually defines the major structure of the Web page. Secondary assets are the dependent, related assets, such as graphics, or other data or media files, that are consumed by the primary asset when displayed on the Web browser.

Some of the files defining the WCMS are created when C1 205 selects to edit the Web page. The metafile, WIPMETA 303, which will contain much of the information about the WIP, will be created at this point. Metafiles may include, at least, mapping information for mapping the primary and secondary assets from the staged locations to the live location, any comments that are made from developer/sender to developer/sender, the state of the WIP, each version of the WIP, every user that has been in the workflow, which user currently owns or is in control of the WIP, a version list, and the like. As C1 205 selects to edit Web page X, the WIP state for Web page X is set in M1.xml 307 of WIPMETA 303 to an "edit" state. The "edit" states causes a lock to be placed on WIPMETA 303 to prevent any other developer from attempting to edit the WIP. Thus, as C1 205 selects to edit the WIP, WIPMETA 303 is also locked.

Once selected for modification, C1 205 may then modify X.html 301, now a WIP, to reflect any desired changes including adding any new secondary assets or modifying those secondary assets. For purposes of this example, instead of publishing back to the Web server immediately, C1 205 is part of a design group that requires review by two other developers, C2 206 and C3 207, before being available to re-deploy as a live asset on the Web server. This information, i.e., the list of developers in this design group along with the permissions authorized for each of the developers in the group is contained in hub.xml 302. When C1 205 finishes editing WIP X.html 301, he or she provides the intended final location of X.html 301, a process referred to as finalizing, and then selects the "Send For Review" button in the editing console.

Upon selection of the "Send For Review" button, the publishing software performs a number of steps. First, it checks hub.xml 302 to determine who is in the design group workflow and what permissions each member of that group has. A list is also stored in each of the folders of USERS 304 directory. In each user's folder, the user's name and each of the groups that they belong to are noted. Next, metafile, M1.xml 307, is updated. Mapping information is generated in M1.xml 307 using the finalized location information entered by C1 205. If C1 205 included any comments to the other designers when sending for review, those comments are also saved to M1.xml 307. The state of the WIP is changed to an "in transit" state, which, thereafter, causes the lock on WIPMETA 303 to be removed. The new current version of the WIP is saved as Extensible Markup Language (XML) in M1.xml 307. The other designers, C2 206 and C3 207, are noted in the design workflow as being recipients of the WIP for review, and a version list identifying PA_X.html 312, SA1.jpg 313, and SA2.jpg 314, as the current versions of the WIP.

Further in response to C1 205 selecting to send the WIP for review, any user information related to C1 205 is stored in UI 310 directory. Also, sub-directory 1 311, within directory MMWIP 305, is created for staging the current version of the WIP. Primary asset, PA_X.html 312, and secondary assets, SA1.jpg 313 and SA2.jpg 319, are saved to directory 1 311. PA_X.html 312, SA1.jpg 313, and SA2.jpg 314 represent the current version of the WIP that include all of the edits that C1 205 has completed. When the Web documents are staged in MMWIP 305, the links connecting the primary asset, PA_X.html 312, to its secondary assets, SA1.jpg 313 and SA2.jpg 314, are rewritten such that when PA_X.html 312 is displayed by a Web browser, it will properly display the secondary assets, SA1.jpg 313 and SA2.jpg 314.

It should be noted that various embodiments of the present invention may automatically rewrite the links, while other embodiments may request the designer to manually rewrite the links. Additional and/or alternative embodiments may provide for automatically rewriting the links if the developer does not manually rewrite them. The various embodiments of the present invention are not limited to one particular method for rewriting the links.

As C2 206 and C3 207 start their publishing software or a refresh is performed on the running software, the publishing software polls or tracks WIPMETA 303 and USER 304 for any new metadata information or notifications in the user-specific files. Because C1 205 sent the WIP for review to C2 206 and C3 207, as USER 304 is polled, a notification appears on the editing console of C2 206 and C3 207 indicating that a WIP is available for their review. This notification contains a pointer to M1.xml 307. If either or both of C2 206 and C3 207 selects to review the WIP, a copy of the WIP is downloaded to the local computers of C2 206 and C3 207 for review. Thus, copies of PA_X.html 312, SA1.jpg 313, and SA2.jpg 314 are downloaded to C2 206 and C3 207 based on their selection to review the WIP.

The embodiment depicted in FIG. 3 provides that the system users or designers only poll or track their corresponding user folders in USERS 304 for notifications. However, if such designer was involved, in any fashion, in the workflow, their publishing software will also poll or track WIPMETA 303 for any changes. It should be noted that various additional and/or alternative embodiments of the present invention may provide for any number of different polling schemes. For example, a user may automatically poll both USERS 304 and WIPMETA 303 directories, or some other combination of directories. The various embodiments of the present invention are not limited to one particular polling scheme.

For purposes of this example, C2 206 chooses to edit the WIP further. When C2 206 makes this selection on the editing console of the publishing/editing software, M1.xml 307 is amended to reflect the state change of the WIP to an "edit" state. This state change to "edit" again causes a lock to be placed on WIPMETA 303 after which C3 207 may no longer chose to edit the WIP also (until WIPMETA 303 is unlocked). Because C2 206 is now the "owner" of the WIP, the system rewrites X.html.lck 306 to reflect that C2 206 is now also the owner of the lock. All editing of the WIP is now locked for everyone except C2 206.

When C2 206 finishes his or her edits, he or she selects to send it out for continued review to the design workflow group, i.e., C1 205 and C3 207. After making this selection, M1.xml 307 is again updated with the new XML version of the WIP and any comments made by C2 206. The version list is also updated to reflect the current version. The WIP state is changed in M1.xml 307 from "edit" to "in transit," thus, freeing the WIP from the exclusive ownership of the editing C2 206. Furthermore, WIP directory 2 316 is created to hold the current WIP version, PA_X.html 317, SA1.jpg 318, and SA2.jpg 319. A new notification indicating that a WIP is available for review is placed in the user files of C1 205 and C3 207 in directory USER 304 As these user-specific files of USER 304 are polled by the publishing applications, a notification is again received that indicates to C1 205 and C3 207 that the WIP is ready for further review.

For purposes of this example, C3 207 selects to review the WIP. The browser of the editing console is served PA_X.html 317, SA1.jpg 318, and SA2.jpg 319 and is displayed to C3 207. Within C3 207's editing console, a option is presented to publish the WIP. This option is presented by the WCMS system because, as the publishing application checks hub.xml 302, it is discovered that C3 207 has been assigned publishing rights for purposes of this workflow group. Thus, the option is presented to C3 207. C3 207 approves the WIP and selects this publish option. In response, the mapping information from M1.xml 307 is used to deploy the WIP into art accessible location, such as back to the original location of X.html 301. A notification is sent to each of the designers in the workflow group that the WIP has not been published. As this information is updated on the editing console interface, C1 205-C3 207 will receive the notification that the WIP has now been published. The file lock, X.html.lck 306 is removed, which makes Web page X again accessible on the Web server.

The notification process is completed without requiring the use of a separate email server, as in the current CMS systems. By including a user-specific file in USERS 304 directory and providing that the publishing software poll USERS 304 for such notifications, email-like notifications may be carried out. In some embodiments, the types of notifications may be limited to items, such as a notification that a WIP is ready for review, a notification that a WIP has been canceled or deleted, and a notification that a WIP has been published. Additional and/or alternative embodiments of the present invention may include additional notifications, such as notifications of the availability to be included in a particular workflow group, specific notifications that a WIP has been released for review with no edits from a previous version, or any other type of relevant notification for the design and deployment process.

Figure 4:
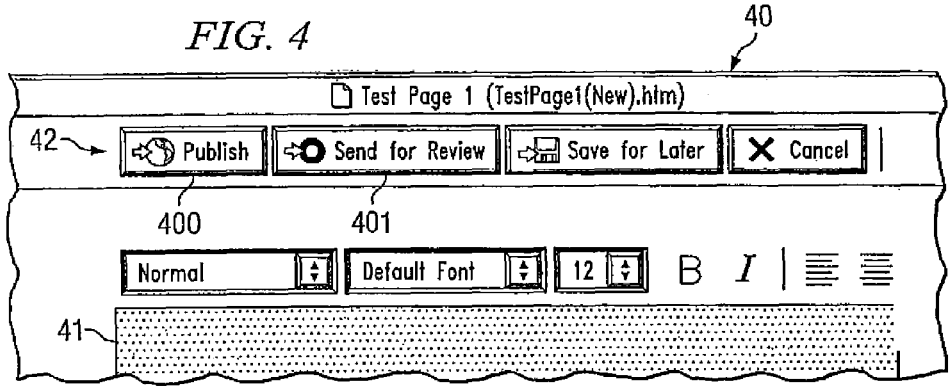
FIG. 4 is a partial screenshot illustrating an editing console of a publishing software configured to implement one embodiment of the present invention.

The examples described in association with FIGS. 2 and 3 disclose publishing software that is used by the developers for implementing a portion of the CMS systems configured according to various embodiments of the present invention. FIG. 4 is a partial screenshot illustrating editing console 41 of publishing software 40 configured to implement one embodiment of the present invention. As the editing user is editing a WIP using publishing software 40, publication toolbar 42 is displayed that offers various tools that are used in the collaboration and deployment process. Publish button 400 and Send For Review button are displayed to the developer on editing console 41. If the developer did not possess publication rights, Publish button 400 would not be displayed. When the developer desires to send the WIP for review to a particular workflow group, he or she would actuate Send For Review button 401. Publishing software 40 would respond by preparing the necessary information on the file structure and placing the appropriate notifications in the user-specific files of the people on the workflow list.

Figure 5:
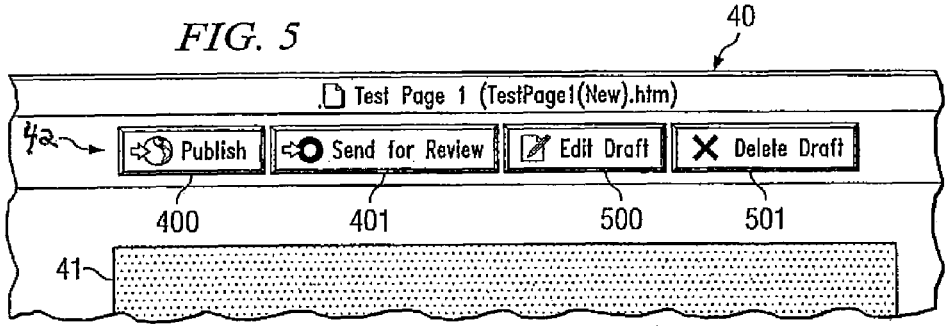
FIG. 5 is a partial screenshot illustrating the reviewing developer version of an editing console of a publishing software configured to implement one embodiment of the present invention.

FIG. 5 is a partial screenshot illustrating the reviewing developer version of editing console 41 of publishing software 40 configured to implement one embodiment of the present invention. When developers in the workflow select to review WIPs that have been sent for review, publication toolbar 42 is presented on editing console 41. Publication toolbar 42 includes the additional features for such reviewing developers, such as Edit Draft button 500 and Delete Draft button 501. Because the reviewing developer is merely reviewing the staged WIP at this point, he or she is offered the option to continue editing through Edit Draft button 500. Similarly, since the reviewing developer implied in FIG. 5 has publish rights, as indicated by the appearance of Publish button 400, he or she would also have rights to delete the WIP through Delete Draft button 501.

Figure 6:
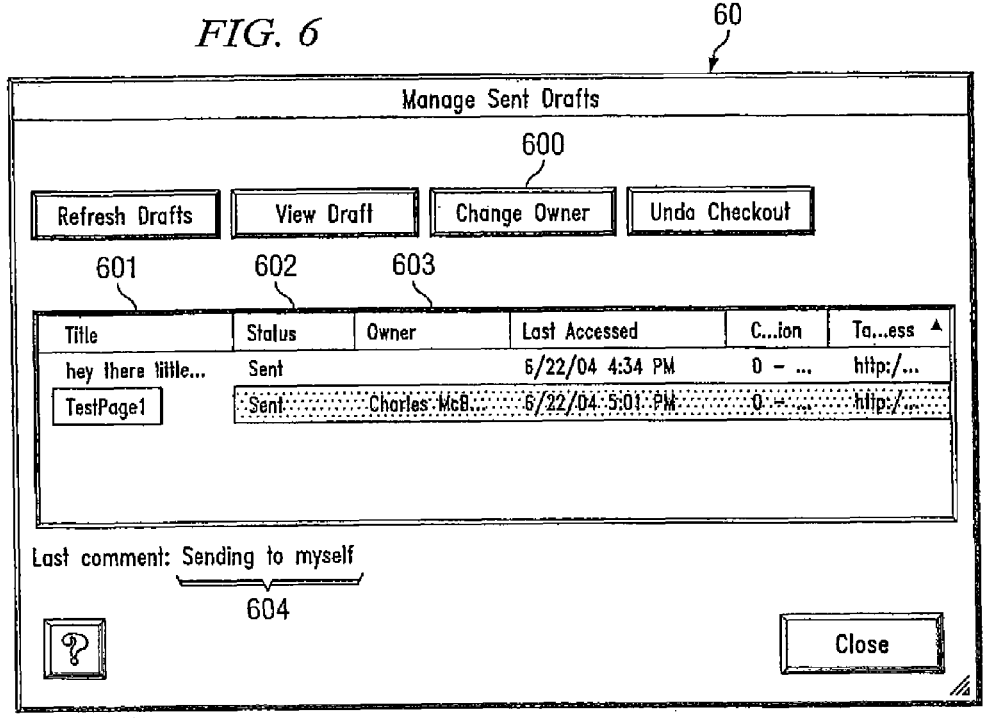
FIG. 6 is a screenshot illustrating a manage console provided in publishing software operable to implement another embodiment of the present invention.

The content of the file structure that implements CMS, file structure 30 (FIG. 3), allows for further useful interface tools, such as the tools provided on editing console 41 (FIG. 4). Because the metadata file for each WIP contains practically all of the information surrounding the transactions conducted on the WIP, it may be leveraged to provide not only information on the WIP but control of the WIP as well. FIG. 6 is a screenshot illustrating manage console 60 provided in publishing software operable to implement another embodiment of the present invention. WIPMETA 303 (FIG. 3) includes metadata files on each WIP being edited or managed in the CMS system. As noted above, the metadata file includes information on most of the activities involving the WIP including the WIP name, the WIP state, the party who owns the WIP or is editing the WIP, as well as any comments made concerning the WIP, the mapping information, and the like. Manage console 60 accesses and present information on the WIPs, such as title 601, status 602, owner 603, comments 604, and the like, and presents that information in a single location.

Manage console 60 also includes function buttons, such as Change Owner button 600, that allows an administrator to change the owner of a particular WIP. Because the metadata file includes data that is used to define the owner of a WIP or even to define a lock on the metadata file, functionality in an interface console, such as manage console 60, may be included that actively edits the data in the metadata file for a particular WIP. Therefore, by changing the owner metadata in the metadata file for a WIP, the owner is changed in the CMS system. The administrator may select Change Owner button 600 and effectively change the WIP's owner.

It should be noted that a benefit to the various embodiments of the present invention is maintaining the metadata files on each WIP that contains all of the relevant information about the WIP. By maintaining all of this information in a single location, management of the WIP may be completed very quickly. Some existing systems keep the same type of information, but maintain it in various locations in the system. It would typically take a considerable amount of time to retrieve all of this information and assemble it in some meaningful fashion. Therefore, the method employed by the various embodiments of the present invention is beneficial.

In additional or alternative embodiments of the present invention, an administrator at manage console 60 may also have the authority to edit the metadata file even if it is locked because the WIP is in an "edit" state. In such embodiments, any edits made by the current editing user may be lost.

Figure 7:
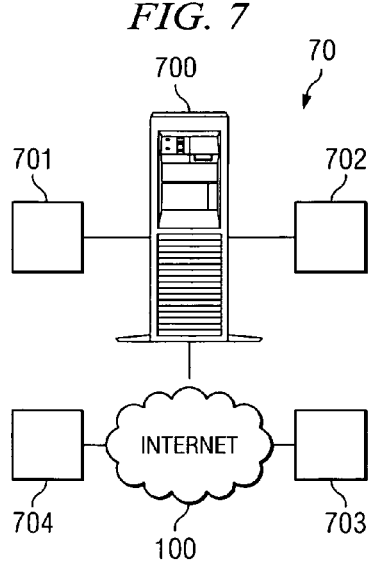
FIG. 7 is a block diagram illustrating an ECMS configured according to another embodiment of the present invention.

FIG. 7 is a block diagram illustrating ECMS 70 configured according to another embodiment of the present invention. ECMS 70 comprises Web server 700 which includes an FTP file system. Web server 700 is able to provide access to users 701 and 702 through an Intranet connection, while is provides access to users 703 and 704 through Internet 100. Users 701-704 connect to Web server 700 using a general purpose computer running management software that interoperates with the FTP system on Web server 700 in addition to providing logic that enables a file system similar to that described in FIG. 3 to be implemented on Web server 700. An example of such management software is MACROMEDIA INC.'s CONTRIBUTET™.

In an example of operation, users 701-704 each belong to a workflow group preparing a press release for Company A. Only user 704 is assigned publication rights. User 701 has been tasked with preparing an executive summary of a quarterly report in addition to a summary worksheet/spreadsheet of the quarterly numbers. User 701 initializes the press release with ECMS 70. ECMS 70, working with the management software run by user 701, establishes a metafile on the press release and creates user folders for each of users 701-704 based on a list of the group residing on Web server 700. The state of the WIP is set in the metal file to an "edit" state, which causes the meta directory to be locked from editing by anyone but user 701. User 701 drafts the executive summary and worksheet and indicates to send for review.

In response to user 701 sending the WIP for review, a WIP folder is created along with a WIP subfolder specifically for user 701 that holds staged copies the press release WIP. The WIP state is changed to "in transit" in the WIP metafile and a notification is placed in each of the user subfolders of users 702-704 indicating that the WIP is ready for review. The management software run by users 702-704 periodically tracks or polls their corresponding user subdirectories to determine if any notifications have been received. When user 701 sends the WIP on for review, users 702-704 receive a notification that the WIP is read. Thereafter, each of users 702-704 calls up the WIP to review its content.

User 703 was tasked to draft a projection about a future project of Company A that included a slide presentation developed with MACROMEDIA INC.'s BREEZE™ presentation software. When user 703 reviews the WIP and determines that user 701 did an acceptable job, he or she selects to edit the WIP from the management software used in viewing the WIP from Web server 700. Responsive to user 703's selection to edit, the WIP state is changed in the metafile to an "edit" state, which causes a lock to be placed on the meta directory. Thus, if user 702 or 704 attempt to edit or user 704 attempts to publish, their selection will be denied since user 703 has selected to edit the WIP.

A copy of the WIP is downloaded from the WIP director on Web server 700 to user 703's local machine. User 703 then adds the BREEZE™ slide presentation along with the projection document and selects to send the updated WIP around for further review. User 703 includes a comment to the group that he or she believes the press release is ready to be released to the public. ECMS 70 again places a notification in each users subfolder that the WIP is ready for review. The WIP state is changed again to "in transit," which removes the lock on the metadata directory. ECMS 70 then creates a new WIP subdirectory for user 703 and stores a staged copy of the current version of the press release WIP therein.

The management software nm by users 701-704 continues polling and tracking for notifications as well as tracking for changes in the metadata directory. When user 704 is notified that the WIP is ready for review again, he or she views it on the user interface of the management software and views user 703's note about the press release WIP being ready for publishing. At this point, user 704 reviews the WIP and agrees that the WIP is ready to publish. Because user 704 is the only user in the group that has publication rights, he or she is the only one who is presented the option to publish.

As user 704 selects to publish the WIP, a notification is placed in each of users 701-704 user subdirectories that the WIP has been published. ECMS 70 checks the version list from the metadata and finds in the lists last entry that the version from user 703 is the latest version. This version of the press release WIP is then sent to the public relations specialist of Company A for release. After sending the final version, ECMS 70 erases all of the metadata information connected with this project as well as the WIP directories that contain the various versions of the WIP. Thus, by utilizing a CMS configured according to one embodiment of the present invention, i.e., ECMS 70, an enterprise management system is provided comprising only a Web server, Web server 700, its FTP file system, and the management software on each of user's 701-704 computers.

Figure 8:
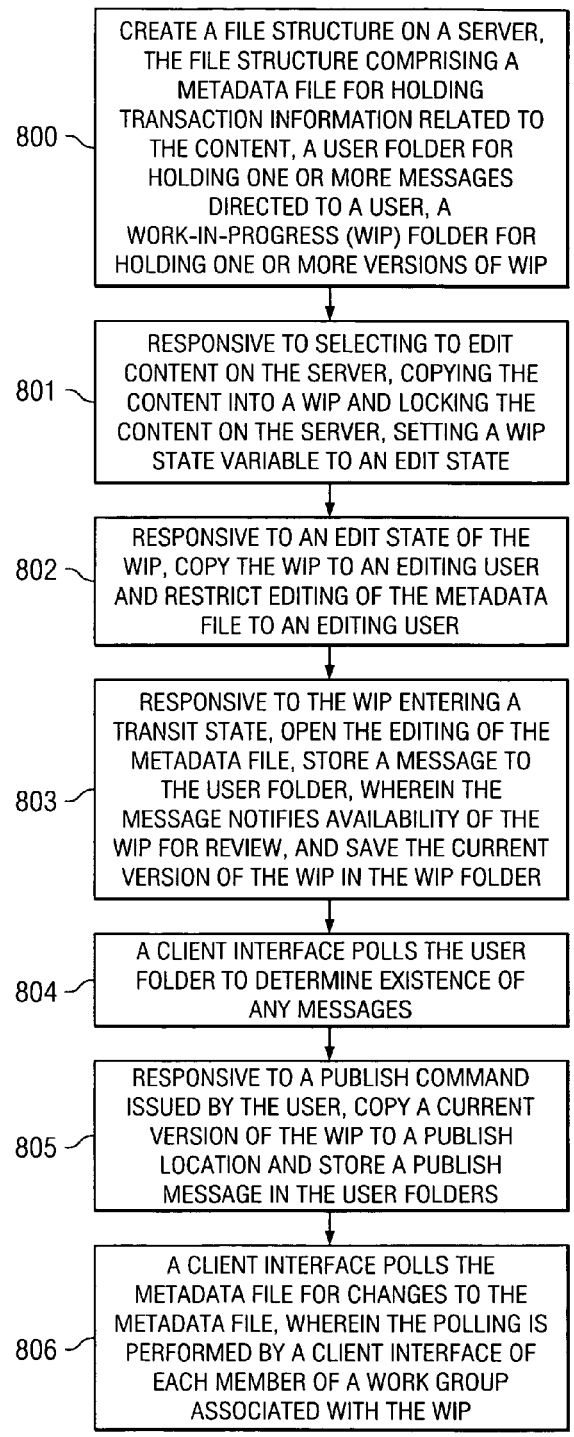
FIG. 8 is a flowchart illustrating example steps executed in implementing one embodiment of the present invention.

FIG. 8 is a flowchart illustrating example steps executed in implementing one embodiment of the present invention. In step 800, a file structure is created on a server, the file structure comprising a metadata file for holding transaction information related to the content, a user folder for holding one or more messages directed to a user, a work-in-progress (WIP) folder for holding one or more versions of WIP. Responsive to selecting to edit content on the server, in step 801, the content is copied into a WIP, the content is locked on the server, and a WIP state variable is set to an edit state. Responsive to an edit state of the WIP, in step 802, the WIP is copied to an editing user, and editing of the metadata file is restricted to an editing user. Responsive to the WIP entering a transit state, in step 803, the editing of the metadata file is opened, a message is stored to the user folder, wherein the message notifies availability of the WIP for review, and the current version of the WIP is saved into the WIP folder. A client interface polls the user folder, in step 804, to determine existence of any messages. Responsive to a publish command issued by the user, in step 805, a current version of the WIP is copied to a publish location, and a publish message is stored in the user folders. A client interface polls the metadata file, in step 806, for changes to the metadata file, wherein the polling is performed by the client interface of each member of a work group associated with the WIP.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 9:
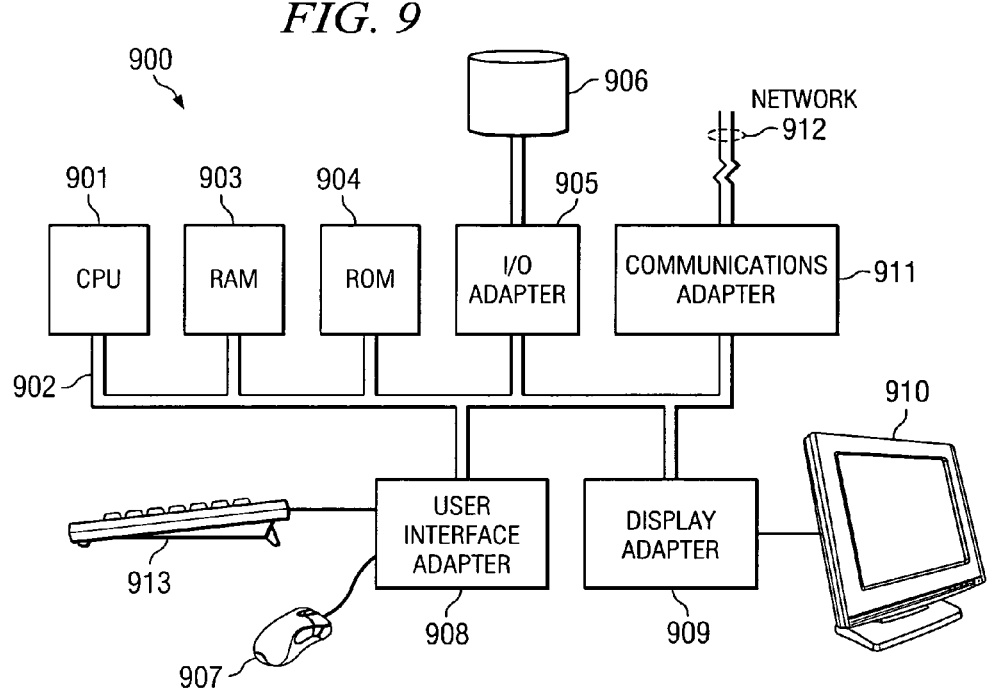
FIG. 9 illustrates a computer system adapted to use embodiments of the present invention.

FIG. 9 illustrates computer system 900 adapted to use embodiments of the present invention, e.g. storing and/or executing software associated with the embodiments. Central processing unit (CPU) 901 is coupled to system bus 902. The CPU 901 may be any general purpose CPU. However, embodiments of the present invention are not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) controller card 905, communications adapter card 911, user interface card 908, and display card 909. The I/O adapter card 905 connects storage devices 906, such as one or more of a hard drive, a CD drive, a floppy disk drive, a tape drive, to computer system 900. The I/O adapter 905 is also connected to a printer (not shown), which would allow the system to print paper copies of information such as documents, photographs, articles, etcetera. Note that the printer may be a printer (e.g., dot matrix, laser, etcetera), a fax machine, scanner, or a copier machine. Communications card 911 is adapted to couple the computer system 900 to a network 912, which may be one or more of a telephone network, a local (LAN) and/or a wide-area (WAN) network, an Ethernet network, and/or the Internet network. User interface card 908 couples user input devices, such as keyboard 913, pointing device 907, etcetera, to the computer system 900. The display card 909 is driven by CPU 901 to control the display on display device 910.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A content management system comprising:
  a non-dedicated server that comprises a live content server that hosts live content and a content server that hosts staged content;
  said content server including:
    a processor coupled to a memory;
    a metadata directory on said content server configured to store a metadata file associated with a work-in-progress (WIP);
    a first folder on said content server for storing notifications to a plurality of users in a workflow group; and
    a second folder on said content server for storing one or more versions of said WIP;
  a remote filing system associated with said content server;
  interface logic at a computer of each of said plurality of users, said interface logic polling said first folder through said remote filing system for locating said notifications; and
  a WIP state variable that controls edit access to said WIP;
  wherein said metadata file comprises information mapping said staged content to said live content, the WIP state variable, and identifying which of the plurality of users is editing the WIP; and
  wherein a content document on said content server is locked responsive to an editing user of said plurality of users selecting said document for editing, wherein, responsive to said user selection, said metadata file is locked for each of said plurality of users except said editing user.

2. The content management system of claim 1 wherein, responsive to said user selection:
  said content document is copied into said WIP on said computer of said editing user; and
  said WIP state variable is set to an edit state.

3. The content management system of claim 1 wherein, responsive to said WIP state variable moving from an edit state to an in transit state:

said WIP is copied into said second folder associated with
said editing user;
said WIP is copied into said metadata file;
said metadata file is unlocked; and
a WIP notification is stored in said first folder.

4. The content management system of claim 3 wherein said WIP notification includes a pointer to said WIP copied to said metadata file.

5. The content management system of claim 1 wherein, responsive to
said WIP state variable moving from an in transit state to an edit state:
a current version of said WIP stored in said second folder document is copied to said computer of said editing user;
said WIP state variable is set to an edit state;
said lock on said content document is rewritten to reflect a change in said editing user; and
said metadata file is locked for each of said plurality of users except said editing user.

6. The content management system of claim 1 wherein, responsive to receiving a publish command from one of said plurality of users:
said content document on said content server is replaced with a current version of said WIP stored in said second folder;
said content document is unlocked; and
a publish notification is stored in said first folder.

7. The content management system of claim 1 wherein said live content is published to be readily accessible by users having access to said live server; and
wherein said staged content is not so published.

8. The content management system of claim 1 wherein said live content is published for general public access; and wherein said staged content is not published for general public access.

9. The content management system of claim 8 wherein said live content server comprises a web server hosting at least one web page; and wherein said live content comprises content of said at least one web page.

10. A method comprising:
creating, on a non-dedicated server that hosts both live content and staged content, a file structure, said file structure comprising:
a live content file that contains said live content;
a metadata directory configured to store a metadata file associated with said staged content;
a user folder for holding one or more messages directed to a user;
a work-in-progress (WIP) folder for holding one or more versions of WIP within said staged content;
responsive to an edit state of said WIP, restricting editing of said metadata file to an editing user;
responsive to said WIP entering a transit state:
opening said editing of said metadata file;
storing one of said one or more messages to said user folder, wherein said message notifies availability of said WIP for review; and
responsive to a publish command issued by said user, copying a current version of said WIP to a publish location;
wherein said metadata file comprises information mapping said staged content to said live content, a WIP state variable, and identifying any user editing the WIP.

11. The method of claim 10 further comprising:
responsive to said publish command, storing a publish message in said user folder.

12. The method of claim 10 further comprising:
responsive to said WIP entering said transit state, saving said current version of said WIP into said WIP folder.

13. The method of claim 10 further comprising:
polling said user folder by a client interface to determine existence of said one or more messages.

14. The method of claim 10 further comprising:
polling said metadata file for changes to said metadata file, wherein said polling is performed by a client interface of each member of a work group associated with said WIP.

15. The method of claim 14 further comprising:
searching a stored list on said server to determine said each member.

16. The method of claim 10 further comprising:
responsive to a first instance of said live content entering said edit state:
copying said live content to a location of said user to become said WIP; and
locking said live content from access by parties other than said user.

17. The method of claim 10 wherein said live content is readily accessible by all users having access to said non-dedicated server, and said staged content is content that is not intended to be readily accessed by all users having access to said non-dedicated server.

18. The method of claim 10 wherein said live content is content that is published for access by users, and said staged content is content that is not published for access by said users.

19. A computer program product having a non-transitory computer readable storage device with computer program logic recorded thereon, said computer program product comprising:
code for creating, on a server that hosts both a) live content that is published for access by users and b) staged content that is not published for access by said users, a file structure, said file structure comprising:
a live content file that contains said live content;
a metadata directory configured to store a metadata file associated with said staged content;
a user folder for holding one or more messages directed to a user;
a work-in-progress (WIP) folder for holding one or more versions of WIP in said staged content;
responsive to an edit state of said WIP, code for restricting editing of said metadata file to an editing user;
responsive to said WIP entering a transit state:
code for opening said editing of said metadata file;
code for storing one of said one or more messages to said user folder, wherein said message notifies availability of said WIP for review; and
responsive to a publish command issued by said user, code for copying a current version of said WIP to a publish location;
wherein said metadata file comprises information mapping said staged content to said live content, a WIP state variable, and identifying any user editing the WIP.

20. The computer program product of claim 19 further comprising:
responsive to said publish command, code for storing a publish message in said user folder.

21. The computer program product of claim 19 further comprising:
responsive to said WIP entering said transit state, code for saving said current version of said WIP into said WIP folder.

22. The computer program product of claim 19 further comprising:
   code for polling said user folder by a client interface to determine existence of said one or more messages.

23. The computer program product of claim 19 further comprising:
   code for polling said metadata file for changes to said metadata file, wherein said code for polling is executed by a client interface of each member of a work group associated with said WIP.

24. The computer program product of claim 23 further comprising:
   code for searching a stored list on said server to determine said each member.

25. The computer program product of claim 19 wherein said live content comprises:
   pre-existing content on said server;
   responsive to a first instance of said live content entering said edit state:
      code for copying said live content to a location of said user to become said WIP; and
      code for locking said live content from access by parties other than said user.

26. A system comprising:
   a server comprising both a) a web server that hosts live web content that is published for general public access and b) a content management server that hosts staged content that is not published for general public access;
   a processor coupled to a memory on said server;
   a file structure on said server, said file structure comprising a live web content file that contains said live web content hosted by said web server;
   said content management server comprising means for creating in said file structure:
      a metadata directory configured to store a metadata file associated with said staged content;
      a user folder for holding one or more messages directed to a user;
      a work-in-progress (WIP) folder for holding one or more versions of WIP in said staged content;
   responsive to an edit state of said WIP, means for restricting editing of said metadata file to an editing user;
   responsive to said WIP entering a transit state:
      means for opening said editing of said metadata file;
      means for storing one of said one or more messages to said user folder, wherein said message notifies availability of said WIP for review; and
   responsive to a publish command issued by said user, means for copying a current version of said WIP to a publish location;
   wherein said metadata file comprises information mapping said staged content to said live content, a WIP state variable, and identifying any user editing the WIP.

27. The system of claim 26 further comprising:
   responsive to said publish command, means for storing a publish message in said user folder.

28. The system of claim 26 further comprising:
   responsive to said WIP entering said transit state, means for saving said current version of said WIP into said WIP folder.

29. The system of claim 26 further comprising:
   means for polling said user folder by a client interface to determine existence of said one or more messages.

30. The system of claim 26 further comprising:
   means for polling said metadata file for changes to said metadata file, wherein said means for polling is performed by a client interface of each member of a work group associated with said WIP.

31. The system of claim 30 further comprising:
   means for searching a stored list on said server to determine said each member.

32. The system of claim 26 further comprising:
   means for copying said live web content to a location of said user to become said WIP; and
   means for locking said WIP from access by parties other than said user.

* * * * *